(No Model.)
M. HANFORD.
APPARATUS FOR COOLING BEER.
No. 426,805. Patented Apr. 29, 1890.
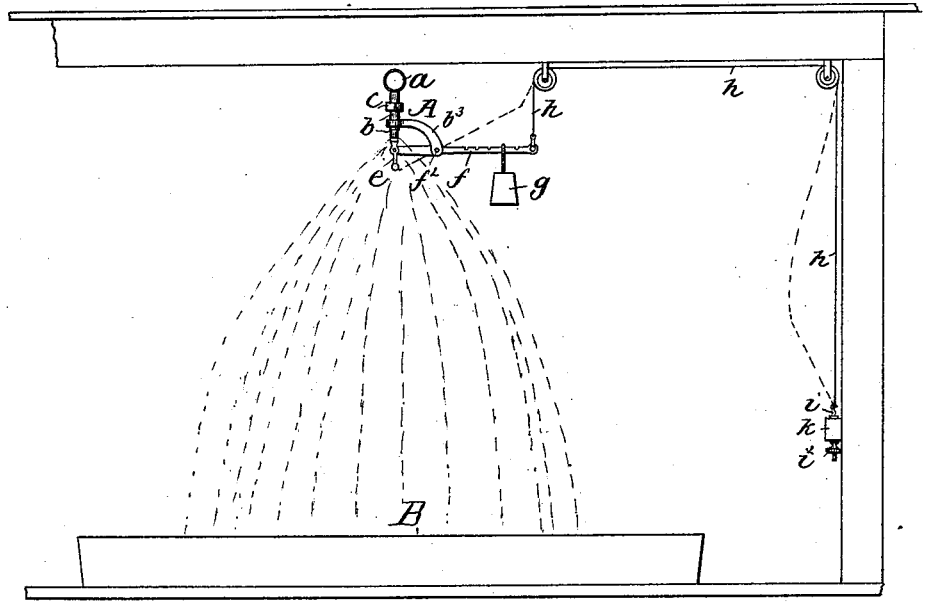
Fig. 1.
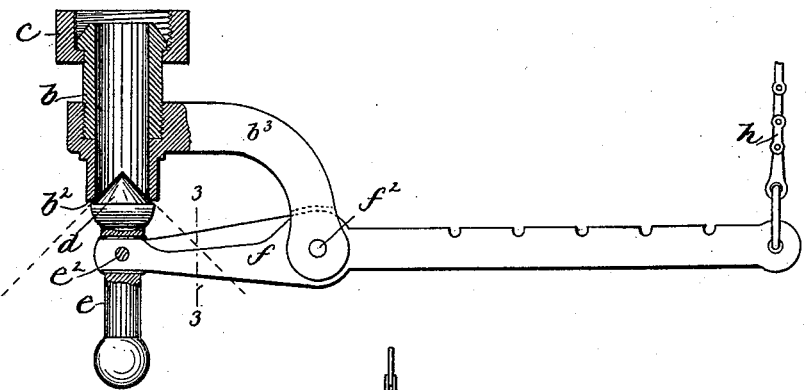
Fig. 2.
Fig. 3.
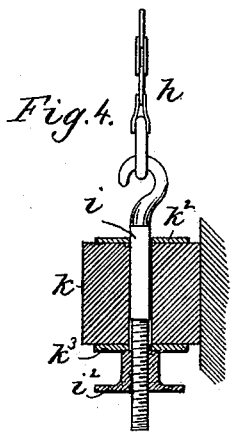
Fig. 4.
Witnesses,
Jas. J. Maloney
M. E. Hill
Inventor,
Melancthon Hanford,
by Jo. P. Livermore
Att'y.

United States Patent Office.

MELANCTHON HANFORD, OF MALDEN, MASSACHUSETTS, ASSIGNOR, BY MESNE ASSIGNMENTS, TO THE HANFORD-STANFORD COMPANY, OF MAINE.

APPARATUS FOR COOLING BEER.

SPECIFICATION forming part of Letters Patent No. 426,805, dated April 29, 1890.

Application filed January 15, 1889. Serial No. 296,427. (No model.)

*To all whom it may concern:*

Be it known that I, MELANCTHON HANFORD, of Malden, county of Middlesex, and State of Massachusetts, have invented an Improvement in Apparatus for Cooling Beer, of which the following description, in connection with the accompanying drawings, is a specification, like letters on the drawings representing like parts.

My invention relates to an apparatus for cooling and aerating the hot wort for the production of malt liquors in accordance with the method shown in Letters Patent No. 382,155, granted May 1, 1888. In apparatus of this kind the spraying tubes or nozzles are likely to become clogged in the operation of atomizing the hot liquid, and various attempts have been made to produce a nozzle which would deliver a uniform spray of the desired fineness, and at the same time would be capable of affording a large unobstructed passage for the purpose of flushing in case the spraying-orifice should become clogged. In all such contrivances, so far as known to me, having a deflector which co-operates with the mouth of the delivery-tube to make a narrow annular spraying orifice, the deflector has been supported or guided by or in some way connected with a part having either a rotary or sliding movement on some part of the body of the spraying device or part in which the delivery-tube is formed. Such contrivances have invariably proved extremely objectionable, if not wholly inoperative in actual practice, owing to the gummy nature of the liquid, which soon practically cements together the moving parts by which the spraying-deflector is supported and adjusted with relation to the orifice, so that the said deflector cannot be moved to afford the large direct passage required for the proper flushing, nor for adjusting the width of the narrow spraying-orifice. These objections are overcome by my invention, which is embodied in a spraying-nozzle having a deflector of the kind just referred to, and relates mainly to the means for supporting and operating the deflector that co-operates with the mouth of the tube or nozzle to form the annular and preferably conical or flaring spraying-orifice through which the liquid is delivered, such kind of an orifice having proved to be efficient for spraying the liquid, and of itself forming no part of the present invention. In order to provide a suitable support for the said deflector by which it may be held in any desired proximity to the mouth of the delivery-tube, so as to form a spray of any desired degree of fineness, and at the same time to afford means for moving the deflector away from said mouth or orifice, so as to afford a large unobstructed passage for flushing, the deflector is, in accordance with this invention, supported and guided solely by a lever itself supported on a suitable fulcrum or pivot, and preferably provided with a counter-balance sufficient to sustain the deflector against the normal pressure of the fluid. The said lever is also controlled by a cord or chain, which may be extended to any suitable point accessible to an attendant and provided with an adjustable fastener which limits the movement of the lever in the direction that carries the deflector toward the mouth of the delivery-tube, and thus determines the size of the orifice. By merely pulling on the chain the lever may be swung so as to move the deflector any desired distance away from the orifice, thus leaving a free and unobstructed passage for the escape of liquid, which will then carry away any solid matter that may have accumulated in the orifice, or, in other words, will effectually flush and clean the spraying devices.

Figure 1 is a sectional view of a cooling-room, showing the main portion of the apparatus for cooling and aerating the hot liquid in side elevation. Fig. 2 is a side elevation, partly in longitudinal section, of one of the spraying-nozzles on a larger scale; Fig. 3, a detail showing a cross-section on line 3 3, Fig. 2, of the deflector-supporting lever at the part traversed by the issuing stream or sheet of liquid; and Fig. 4, a detail showing one of the adjusting devices for determining the position of the deflector.

The spraying tubes or nozzles A are especially intended to be used as part of an apparatus for cooling and aerating malt liquors in accordance with the method forming the subject of Patent No. 382,155, before referred to, the portions of the said apparatus with which the said spraying-nozzles most directly co-operate comprising the supplying-pipe $a$, into which the hot liquor is forced from the boiling kettle, and which is supported in the cooling-room at some distance above a collecting-receptacle B, that receives the liquid when delivered from the said supply-pipe $a$ through the nozzles A, several of which are commonly connected with a single supply-pipe, the number varying according to the amount of liquid to be operated upon, and in practice usually ranging from five or six to ten or fifteen. Each of said nozzles is, however, entirely independent in its operation of all others, so that but one need be described. Each of said nozzles is composed, mainly, of a main tubular body $b$, provided at one end with means for attaching it to and placing it in communication with the supply-pipe $a$, it being shown in this instance as connected by means of a coupling-nut $c$, which enables the device to be readily set in any desired angular position. The body $b$ has a straight uninterrupted passage through it, and terminates at its lower end in a mouth or orifice $b^2$, which may be made slightly tapering or conical around its inner periphery, and below and in line with said mouth is supported a deflector $d$, that is tapering or conical in shape and capable of seating within and so as to tightly close the mouth $b^2$ of the nozzle like a valve; but when held a short distance off from said seat the said deflector forms, with the mouth of the nozzle, a narrow annular flaring passage, through which the liquid issues in a thin flaring divergent sheet, the divergence of which almost immediately causes the liquid to be broken up into minute particles or spray, which fall gently through the atmosphere into the collector B. Such a deflector has been used prior to this invention, and I do not herein claim the delivery-tube and deflector, the present invention relating to the means for supporting and operating the deflector, which will now be described.

The deflector is supported just outside the mouth $b^2$ upon the stem $e$, preferably pivotally connected at $e^2$ with one arm of a lever $f$, itself fulcrumed at $f^2$, and provided with a counter-balance, shown in this instance as a weight $g$, (see Fig. 1,) which is adjustable along the long arm of the lever, so as to vary and adjust the force by which the deflector $d$ is sustained against the pressure of the outcoming liquid. The said weight $g$ or counterbalancing force is preferably adjusted so as to slightly overbalance the pressure of the liquid on the deflector $d$ when the orifice is of minimum size and the pressure on the liquid is of normal amount, and if the orifice should become clogged by solid matters carried by the liquid the pressure on the deflector would be somewhat increased, and would thus force the deflector farther away from the mouth, increasing the size of the orifice and permitting the liquid to flow in a heavier stream, and thus carry off the solid matter or flush out the nozzle. Such flushing operation is entirely automatic; but inasmuch as the pressure may not always be sufficient to open the nozzle and flush it automatically means are provided for positively operating the lever $f$ so as to widely open the orifice, if need be. This might of course be done by merely raising the lever by hand, if it were accessible; but as the entire spraying device is usually not easily accessible while the operation is going on the said lever is, in accordance with this invention, provided with an operating cord or chain $h$, extending over suitable guides or pulleys to a point easily accessible to the operator, who, by pulling on said chain, will open the atomizer and permit the solid stream to issue, and thus thoroughly flush out the nozzle.

It has heretofore been customary in apparatus of this kind to adjust the deflector for its normal position relative to the mouth of the delivery-tube by means of a stop of some kind forming a part of the body of the delivery-tube or of the adjusting-support for the deflector on the delivery-tube itself. This is objectionable, for the reason that if one of the nozzles requires adjustment the operation of the entire apparatus must be stopped, as the nozzles are practically inaccessible while the operation is going on. These objections are overcome in the present invention by leaving the supporting-lever $f$ and the deflector $d$ perfectly free, so far as their connection with the body of the atomizer is concerned, to move until the deflector $d$ becomes wholly seated; but in order to prevent it from seating, and to adjust or limit its nearest approach to the mouth of the delivery-tube, the cord or chain $h$ is connected at its end to a fastener or adjusting device, (best shown in Fig. 4,) consisting of a slide-bar $i$, to which the chain is connected, said slide-bar moving in a guide $k$, and being threaded at one end and provided with a nut $i^2$, that engages the said guide, so that by rotating said nut the slide-bar is moved in one or the other direction, thus taking up or letting out the chain $h$, which forms a support for the outer end of the lever $f$, limiting the movement of the said lever produced by the weight $g$, by which the deflector $d$ is caused to approach the mouth $b^2$.

The guide $k$ may be a transverse bar of wood bored to receive the several slide-bars $i$, co-operating with the several nozzles, and the upper part of said slide-bar is squared in cross-section, as shown, and works in a washer or plate $k^2$, having a square opening, which prevents the bar from turning when the nut $i^2$ is turned for the purpose of adjusting the chain. The said nut $i^2$ bears against a metal plate or washer $k^3$ at the under side of the guide-bar $k$.

As the chains $h$ are flexible, they can be carried to any desired point, and all the chains $h$ of the different nozzles may be brought down side by side, merely setting them far enough apart to enable one to be operated independently of the others without inconvenience, and the operator may thus readily adjust any nozzle while the operation is going on, and if it should be noticed that any nozzle was clogged and failed to clear itself the operator, by merely pulling laterally upon the corresponding chain above its support, would open that nozzle widely, as indicated in dotted lines, Fig. 1, thus enabling it to be perfectly flushed out.

The deflector $d$ might be rigidly connected with the lever $f$; but by pivoting it, as shown, and allowing it a slight movement on its pivot, it will center itself under the pressure of the issuing liquid, so as to make the annular passage of substantially equal width all around.

The joint or hinge connection $e^2$ between the deflector stem and lever is made to admit of only a very small movement, so that the deflector cannot fail to come into the mouth of the delivery-tube, and the stem is extended below the said joint and weighted, as shown, so as to tend to keep it vertical.

The fulcrum-support of the lever $f$ is shown in this instance as made at the end of a bracket $b^3$, extending from the body of the delivery-tube $b$ of the spraying device, and is outside of the range of the issuing liquid; but even if the pivot or fulcrum of the lever should become sticky by the gumminess of the liquid it would, owing to the slight surface exposed and to the great leverage of the force applied to move the lever, be perfectly easily moved, while anything operating with a sliding action, like a sleeve moving longitudinally on the outside of the delivery-tube or two parts engaged by a screw-thread, would become gummed together by the liquid and held very firmly, so as to make it almost an impossibility to operate the deflector.

That portion of the lever $f$ which is traversed by the issuing liquid is made thin and sharp in the line of movement of the liquid, so as to afford but little obstruction thereto, as clearly shown in Fig. 3.

It is very objectionable to have all of the spraying-nozzles operated simultaneously for the purpose of flushing, as in many cases only one requires to be flushed out; but if flushing mechanism actuated in common for all is employed they would all have to be opened in order to clear that particular one, and such opening materially reduces the pressure of the liquid, so that the flushing operation is less effectual than when one only is opened, and furthermore it lets a large amount of liquid escape without being reduced to spray and having its temperature lowered; but by providing simple and effectual means by which each atomizer may be flushed out separately such objections are overcome, and the flushing operation is not only made more effectual, but is effected without so much loss in the cooling and aerating effect.

I claim—

1. A spraying device consisting of a delivery-tube open at one end, combined with a deflector and a counterbalanced lever in which the deflector is pivoted and upon which it is self-centering relatively to the delivery-tube, and which lever is the sole support of the said deflector, substantially as described.

2. A spraying device consisting of a delivery-tube open at one end, combined with a deflector and a counterbalanced lever in which the deflector is pivoted and upon which it is self-centering relatively to the delivery-tube, and which lever is the sole support of the said deflector, a cord or chain connected with said lever, and an adjustable fastener, whereby the deflector may be adjusted relatively to its proximity to the exit of the delivery-tube, substantially as described.

3. A spraying device consisting of a delivery-tube open at one end, combined with a deflector and a counterbalanced lever in which the deflector is pivoted and upon which it is self-centering relatively to the delivery-tube, and which lever is the sole support of the said deflector, and a bracket arranged upon the delivery-tube and in which the lever is fulcrumed, substantially as described.

In testimony whereof I have signed my name to this specification in the presence of two subscribing witnesses.

MELANCTHON HANFORD.

Witnesses:
    Jos. P. Livermore,
    Jas. J. Maloney.